Oct. 5, 1926.
P. E. KELLY
1,601,738
ROD WEEDER
Filed Oct. 24, 1925
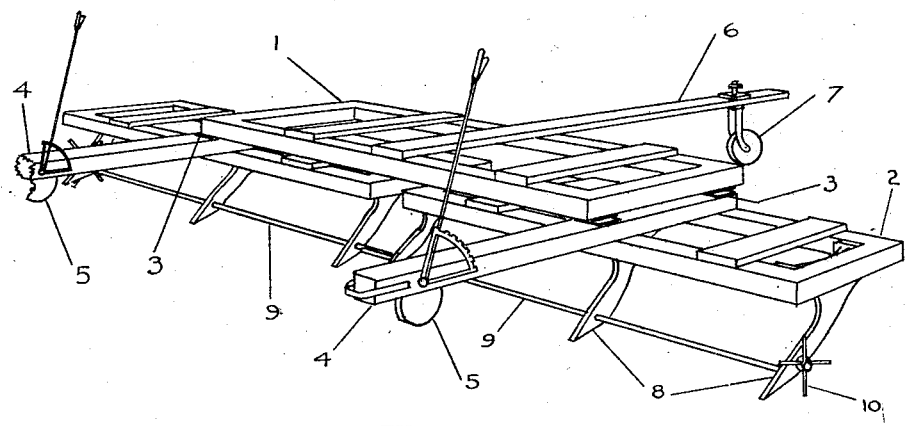
Fig.1
Fig.2
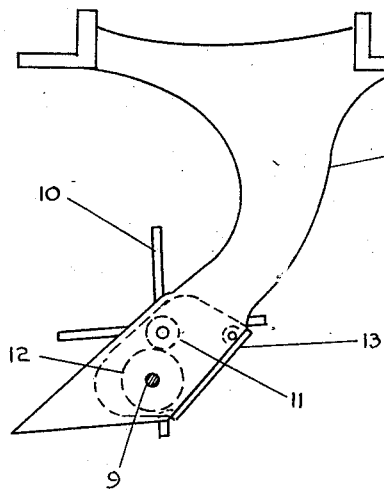
Fig.3
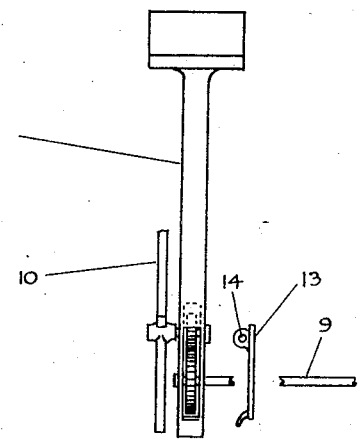
Inventor:
P. E. Kelly.
By
E. J. Fetherstonhaugh
attorney.

Patented Oct. 5, 1926.

1,601,738

UNITED STATES PATENT OFFICE.

PERCY EDWARD KELLY, OF CALGARY, ALBERTA, CANADA.

ROD WEEDER.

Application filed October 24, 1925. Serial No. 64,615.

The invention relates to a rod weeder as described in the present specification and illustrated in the accompanying drawings that form part of the same.

The invention consists essentially of the novel features of construction pointed out in the claim for novelty following a description in detail of an acceptable form of the invention.

The objects of the invention are to eliminate the use of hand implements for the removal of weeds and like growths from arable land, and also assist in its cultivation thereby promoting the maturing properties of the soil for its requirements in agriculture, to produce such an implement that will overcome the many obstacles found in implements of this nature and at the same time be inexpensive and therefore beneficial to the producer and the public.

In the drawings Figure 1 is a perspective view of the invention.

Figure 2 is a side elevation of a cultivator showing the means for operating the rod.

Figure 3 is a front elevation of Figure 2.

Like numerals of reference indicate corresponding parts in the various figures.

Referring to the drawings the upper frame 1 of the machine is secured to the carrier frame 2, by the hinges 3 secured to the leading beams 4 and 4, the carrier frame 2 being constructed in two parts to allow the machine a fair degree of flexibility in its passage over any rough ground when in use. The running wheels 5 are mounted on the beams 4 at the front end of the machine and the tail bar 6 extending rearwardly of the upper frame 1 carries the rear running wheel 7 which is mounted in a bracket pivotally secured to said tail bar 6.

Secured to the undersides of the carrier frames 2 and at the middle and ends thereof are the cultivator standards 8 which act as bearings for the weeding rods 9. The weeding rods 9 are operated by the spoke wheels 10 mounted on the extreme outer cultivator standards 8. Rotatably mounted within the two outer standards and secured to the shafts of the wheels 10 are the gear wheels 11 which coact with the gear wheels 12 mounted on the outer ends of the shafts 9, therefore it will be seen that rotating of the wheels 10 will in turn rotate the weeder shaft 9 through the gears 11 and 12 within the standards 8. To protect the gears 11 and 12 from clogging etc. the cover plate 13 is secured to the standard 8 over the gears through the lug 14.

On the operation of this machine, power is applied to the beams 4 and the machine drawn along that portion of ground to be weeded. This action causes the cultivators to dig into the earth and bring the spoke wheels 10 in contact with the earth therefore rotating the rods 9 which pull the weeds up by the roots and deposit them on the ground.

The rods 9 are operated from 2 to 4 inches under the surface and this distance may be varied to suit the nature of the weeds by the means of levers shown secured to the running wheels 5.

What I claim is:—

A rod weeder comprising a pair of frames having forwardly directed digging members secured to their undersides, draft bars secured to said frames, a connecting frame hinged to said draft bars and having a tail bar extending therefrom, wheels supporting said draft and tail bars, and a rod reversely driven and journaled in the lower free ends of said diggers.

PERCY EDWARD KELLY.